US011309610B2

(12) United States Patent
Sperl et al.

(10) Patent No.: US 11,309,610 B2
(45) Date of Patent: Apr. 19, 2022

(54) ELECTRICAL ENERGY STORAGE DEVICE AND ELECTRICAL APPLIANCE

(71) Applicant: Alfred Kärcher SE & Co. KG, Winnenden (DE)

(72) Inventors: Michael Sperl, Stuttgart (DE); Juergen Kloepfer, Burgstetten (DE); Thomas Hofer, Auenwald (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 49 days.

(21) Appl. No.: 16/380,722

(22) Filed: Apr. 10, 2019

(65) Prior Publication Data

US 2019/0237716 A1 Aug. 1, 2019

Related U.S. Application Data

(63) Continuation of application No. PCT/EP2016/074233, filed on Oct. 10, 2016.

(51) Int. Cl.
| | |
|---|---|
| *H01M 50/213* | (2021.01) |
| *H01M 50/20* | (2021.01) |
| *H01M 50/172* | (2021.01) |
| *H01M 50/183* | (2021.01) |
| *H01M 50/543* | (2021.01) |

(Continued)

(52) U.S. Cl.
CPC ....... *H01M 50/213* (2021.01); *H01M 50/172* (2021.01); *H01M 50/183* (2021.01); *H01M 50/20* (2021.01); *H01M 50/543* (2021.01); *H01R 13/04* (2013.01); *H01R 13/639* (2013.01); *H01M 2220/30* (2013.01)

(58) Field of Classification Search
CPC .... H01M 2/1055; H01M 2/1022; H01M 2/06; H01M 2/08; H01M 2/30; H01M 2220/30; H01R 13/04; H01R 13/639
See application file for complete search history.

(56) References Cited

U.S. PATENT DOCUMENTS

2003/0186114 A1* 10/2003 Lohr ................... H01M 10/613
429/96
2007/0224492 A1 9/2007 Scott et al.
(Continued)

FOREIGN PATENT DOCUMENTS

| CN | 103956441 A | 7/2014 |
|---|---|---|
| CN | 204992064 U | 1/2016 |

(Continued)

*Primary Examiner* — Michael L Dignan
(74) *Attorney, Agent, or Firm* — Womble Bond Dickinson (US) LLP

(57) ABSTRACT

The present invention relates to a electrical energy storage device for an electrical appliance, which electrical energy storage device includes a housing, which housing defines a receiving space in which at least one electrical energy store is received, which electrical energy storage device includes at least two electrically conductive contacts which are accessible from an outer side of the housing and which are electrically operatively connected directly or indirectly to the at least one electrical energy store, wherein the housing has at least one contact opening, through which the at least two contacts are accessible or protrude from the housing, and wherein the at least one contact opening is surrounded by a continuous sealing element.

10 Claims, 10 Drawing Sheets

(51) Int. Cl.
   *H01R 13/04*    (2006.01)
   *H01R 13/639*   (2006.01)

(56) References Cited

U.S. PATENT DOCUMENTS

| | | |
|---|---|---|
| 2008/0224657 A1 | 9/2008 | Hensel et al. |
| 2009/0004555 A1 | 1/2009 | Lohr et al. |
| 2010/0248016 A1* | 9/2010 | Hanawa .................... B25F 5/02 |
| | | 429/178 |
| 2012/0018534 A1 | 1/2012 | Gilpatrick |
| 2013/0295426 A1 | 11/2013 | Halavart et al. |
| 2014/0248519 A1 | 9/2014 | Nishikawa et al. |
| 2015/0214520 A1* | 7/2015 | Nishikawa ................ B25F 5/02 |
| | | 429/100 |
| 2017/0331085 A1 | 11/2017 | Acikgoez et al. |

FOREIGN PATENT DOCUMENTS

| | | |
|---|---|---|
| CN | 205495890 U | 8/2016 |
| CN | 205570600 U | 9/2016 |
| DE | 10 2013 202 022 | 8/2014 |
| DE | 10 2014 214 070 | 2/2016 |
| EP | 0 821 444 | 1/1998 |
| EP | 1 833 137 | 9/2007 |
| WO | WO 2008/138310 | 11/2008 |

\* cited by examiner

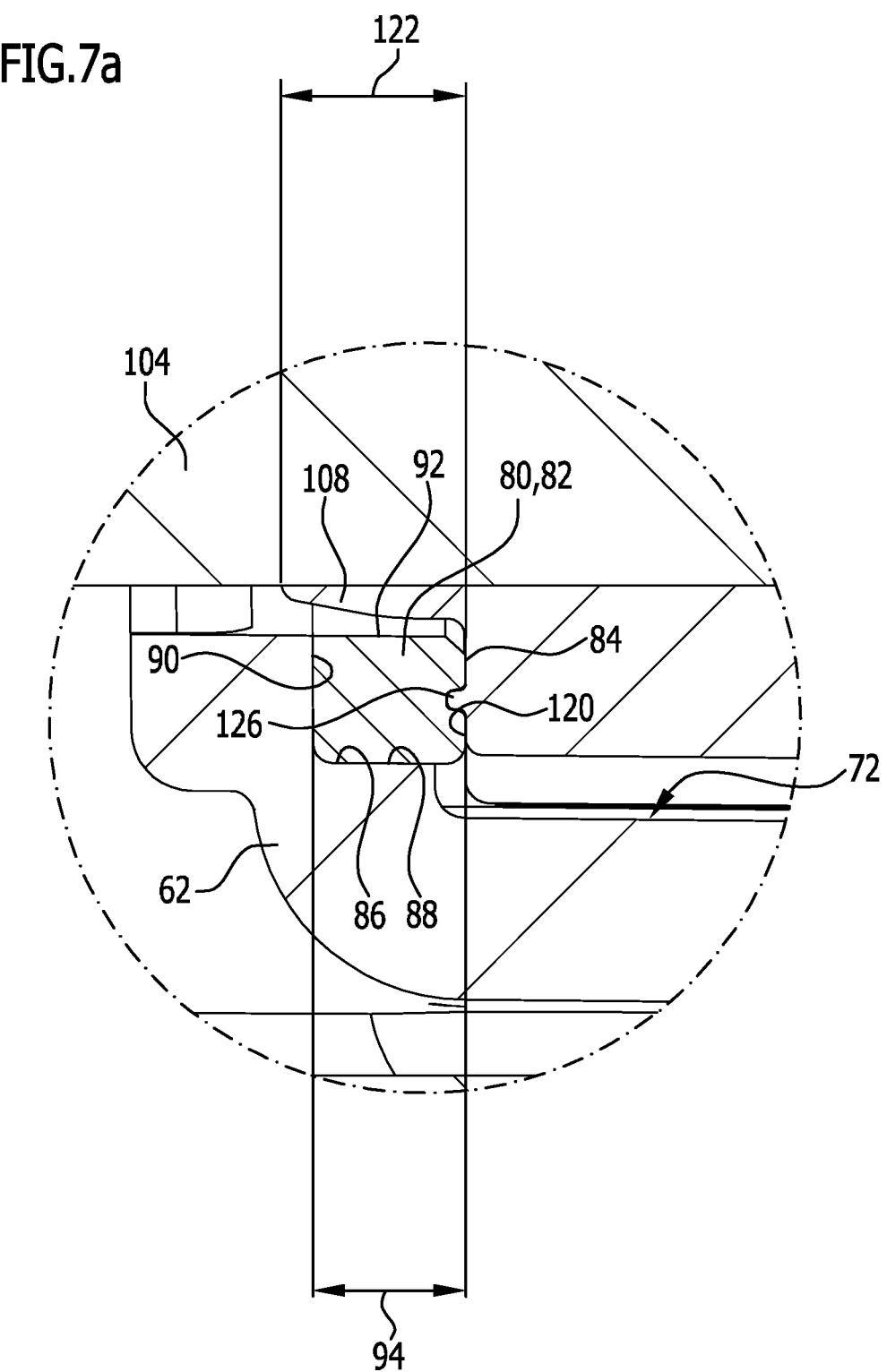

ELECTRICAL ENERGY STORAGE DEVICE AND ELECTRICAL APPLIANCE

CROSS-REFERENCE TO RELATED APPLICATIONS

This application is a continuation of international application number PCT/EP2016/074233 filed on Oct. 10, 2016, which is incorporated herein by reference in their entirety and for all purposes.

FIELD OF THE INVENTION

The present invention relates to electrical energy storage devices for electrical appliances generally, and more specifically to an electrical energy storage device for an electrical appliance, which electrical energy storage device comprises a housing, which housing defines a receiving space in which at least one electrical energy store is received, which electrical energy storage device comprises at least two electrically conductive contacts, which are accessible from an outer side of the housing and which are electrically operatively connected directly or indirectly to the at least one electrical energy store.

The present invention also relates to electrical appliances generally, and more specifically to an electrical appliance having at least one electrical load which is received at least partially, in particular completely, in an appliance housing, which electrical appliance comprises at least two electrically conductive appliance contacts, which are accessible from an outer side of the housing and which are electrically operatively connected directly or indirectly to the at least one electrical load.

BACKGROUND OF THE INVENTION

Electrical energy storage devices and electrical appliances of the kind described in the introduction are used for example in the form of gardening appliances. In this case both the electrical energy storage device and the electrical appliance come into contact with moisture, this being practically unavoidable. There is thus also a risk, however, that the at least two contacts of the electrical energy storage device and the at least two appliance contacts of the electrical appliance will come into contact with the moisture and corrode.

In particular if the at least two contacts of the electrical energy storage device and the at least two appliance contacts of the electrical appliance are electrically operatively connected and high currents flow through the contacts or the appliance contacts for operation of the electrical appliance, there is a particularly high susceptibility to corrosion.

SUMMARY OF THE INVENTION

In a first aspect of the invention, an electrical energy storage device for an electrical appliance is provided. The electrical energy storage device comprises a housing, which housing defines a receiving space in which at least one electrical energy store is received. The electrical energy storage device comprises at least two electrically conductive contacts which are accessible from an outer side of the housing and which are electrically operatively connected directly or indirectly to the at least one electrical energy store. The housing has at least one contact opening, through which the at least two contacts are accessible or protrude from the housing. The at least one contact opening is surrounded by a continuous sealing element.

In a second aspect of the invention, an electrical appliance having at least one electrical load is provided. The electrical load is received at least in part, in particular completely, in an appliance housing. The electrical appliance comprises at least two electrically conductive appliance contacts, which are accessible from an outer side of the appliance housing and which are electrically operatively connected directly or indirectly to the at least one electrical load. The at least two appliance contacts are formed in a manner surrounded by and/or protruding from at least one appliance contact protrusion. The at least one appliance contact protrusion has a polygonal cross-section, in particular a triangular, quadrangular, pentagonal, hexagonal or heptagonal cross-section.

BRIEF DESCRIPTION OF THE DRAWING FIGURES

The foregoing summary and the following description may be better understood in conjunction with the drawing figures, of which:

FIG. 7a shows an enlargement of detail A in FIG. 7;

DETAILED DESCRIPTION OF THE INVENTION

Figure 1:
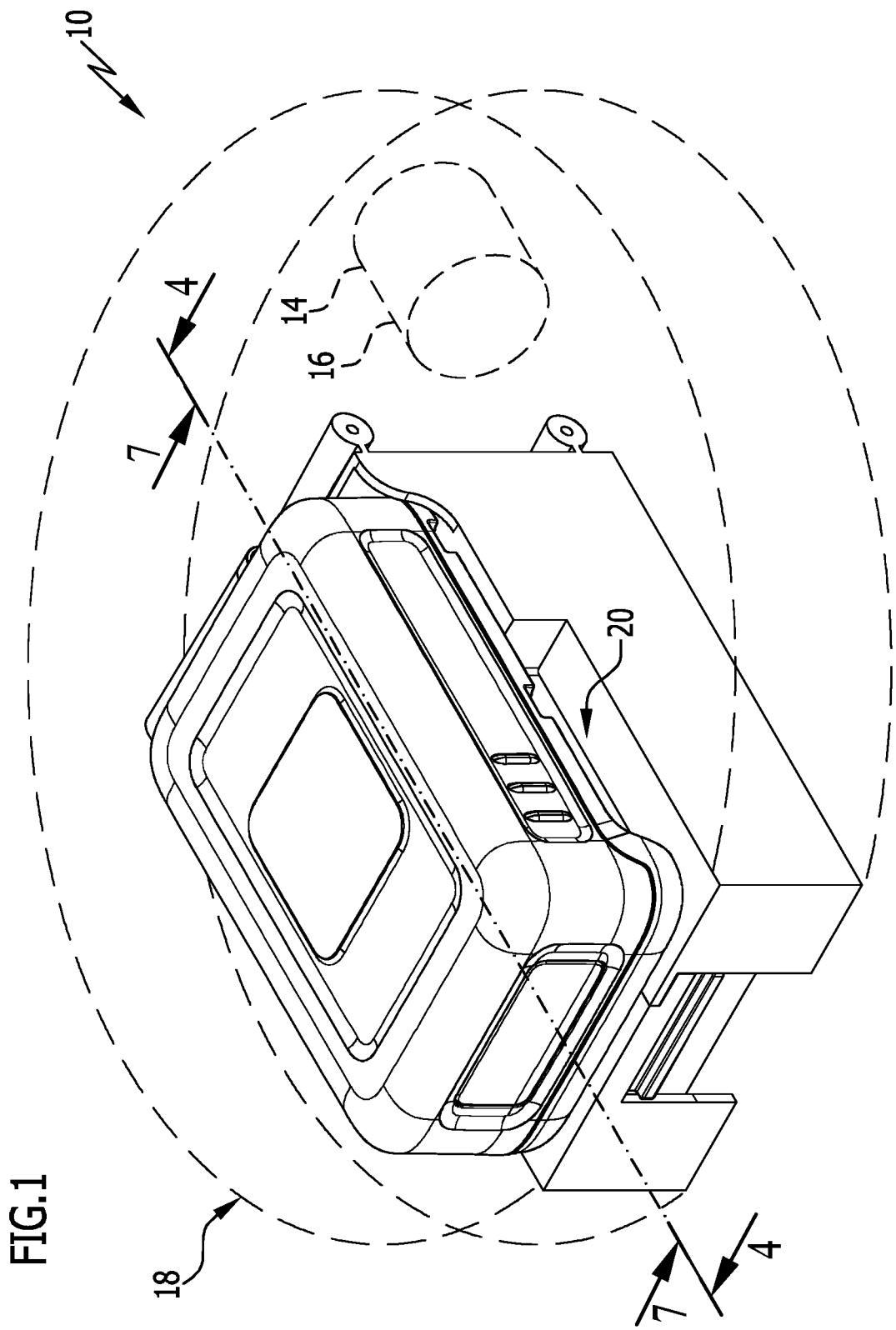
FIG. 1 shows a schematic perspective illustration of a part of an electrical appliance with an energy storage device coupled thereto.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a electrical energy storage device for an electrical appliance, which electrical energy storage device comprises a housing, which housing defines a receiving space in which at least one electrical energy store is received, which electrical energy storage device comprises at least two electrically conductive contacts which are accessible from an outer side of the housing and which are electrically operatively connected directly or indirectly to the at least one electrical energy store, wherein the housing has at least one contact opening, through which the at least two contacts are accessible or protrude from the housing, and wherein the at least one contact opening is surrounded by a continuous sealing element.

In an electrical energy storage device of the kind described in the introduction this object is achieved in accordance with the invention in that the housing has at least one contact opening, through which the at least two contacts are accessible or protrude from the housing, and in that the at least one contact opening is surrounded by a continuous sealing element.

The particular arrangement of the continuous sealing element around the at least one contact opening of the housing makes it possible, in particular, to seal off the electrical energy storage device relative to the housing of the electrical appliance if the electrical energy storage device and the electrical appliance are mechanically and/or electrically coupled to one another. The electrical contacts of the electrical energy storage device and the appliance contacts of the electrical appliance, in the coupled position, thus can be protected from the surrounding environment and also can be arranged fluid-tightly depending on the sealing element. Moisture therefore can no longer reach the at least two electrical contacts and the at least two appliance contacts. In this way corrosion, in particular during operation of the electrical appliance, can be prevented to the greatest possible extent or even completely. The at least two contacts can be arranged in a single contact opening. Alternatively, a separate contact opening can also be provided for each contact. The continuous sealing element can be arranged such that it surrounds all contact openings jointly. However, an individual sealing element may also be provided for each contact opening.

It is favorable, if the at least one sealing element is formed from a sealing element material, if the housing is formed at least partially, in particular completely, of at least one housing material, and if the sealing element material is softer than the housing material. Forming the sealing element from a sealing element material that is softer in comparison to the housing material improves a sealing property of the sealing element. For example, it may bear against a corresponding sealing element of the electrical appliance or also against a sealing edge thereof. This can be also be formed for example of a material that is harder than the sealing element material. The at least one sealing element can thus nestle optimally against a contact face of the electrical appliance when the electrical energy storage device and the electrical appliance are coupled to one another.

A particularly good seal can be achieved in particular if a thickness of the at least one sealing element lies in a range of from approximately 0.2 mm to approximately 2 mm. In particular, the thickness may lie in a range of from approximately 0.4 mm to approximately 0.8 mm. The thinner is the sealing element, the more material can be saved. The thicker is the sealing element, the greater is its ability to compensate for manufacturing tolerances both of the electrical energy storage device and of the electrical appliance.

A width of the at least one sealing element preferably lies in a range of from approximately 0.5 mm to approximately 5 mm. It preferably lies in a range of from approximately 1.5 mm to approximately 2.5 mm. Providing the width of the at least one sealing element in the specified ranges enables a particularly good seal of the energy storage device and of the electrical appliance in the coupled position.

In order to further improve the sealing effect of the at least one sealing element, it is favorable if this is formed from a resilient material or contains a resilient material. A sealing element of this kind can adapt optimally to a contour of the electrical appliance bearing against it.

The resilient material is preferably a rubber. For example, it can be ethylene propylene diene rubber (EPDM), nitrile rubber (NBR) or polyurethane (PUR), or another cross-linking or partially cross-linking natural or synthetic material.

The energy storage device can be formed particularly easily and cost-effectively if the resilient material is a plastics material. In particular the plastics material can be a thermoplastic material. The at least one sealing element can thus be attached to the housing by injection molding, for example.

The processing of the material from which the sealing element is formed can be further improved if the plastics material or the plastics mix is a thermoplastic elastomer or contains at least one thermoplastic elastomer.

Particularly good sealing properties can be achieved if the thermoplastic elastomer is a thermoplastic copolyamide, a thermoplastic polyester elastomer, a thermoplastic copolyester, a thermoplastic elastomer based on olefin, a styrene block copolymer, a thermoplastic elastomer based on urethane, or a cross-linked thermoplastic elastomer based on olefin.

In order to improve in particular a mechanical coupling between the electrical energy storage device and the electrical appliance, it is favorable if the at least one contact opening has a polygonal cross-section. In particular, the at least one contact opening may have a triangular, pentagonal, hexagonal or heptagonal cross-section. In particular, a triangular cross-section has great advantages, since the three inclined inner faces constitute an optimal guide for a corresponding contact protrusion on the electrical appliance. In order to reduce the risk of injury when handling the energy storage device and in order to improve production of the energy storage device, the contact opening of triangular cross-section can be formed with chamfered corners. In particular, a hexagonal cross-section is thus produced, which exclusively has inner angles greater than 90°. The contact opening can thus also be easily cleaned as necessary. The triangular cross-section can be configured in particular in the form of an equilateral triangle or also an isosceles triangle. Either an arbitrary insertion of a corresponding contact protrusion of the electrical appliance can thus be enabled, or, in the case of an isosceles triangle, a uniquely defined coupling between the energy storage device and the electrical appliance.

The at least one contact opening is favorably formed in such a way that it defines precisely one or precisely three planes of symmetry. If it defines precisely one plane of symmetry, a corresponding contact protrusion on the electrical appliance can be inserted into the at least one contact opening only in precisely one orientation. If the at least one contact opening has three planes of symmetry, a contact protrusion can be inserted into the contact opening in three different orientations.

The electrical energy storage device preferably comprises two, three, four, five or more contact openings. In particular, each contact opening can be associated with an electrical contact. The electrical contacts of the energy storage device can thus be easily and reliably electrically insulated with respect to one another.

It is also favorable if the at least two, three, four, five or more contact openings are identical. On the one hand this facilitates the production of the electrical energy storage device. On the other hand in particular a mechanical coupling of the energy storage device to the electrical appliance can also be improved as a result.

For a particularly good seal it is advantageous if each of the at least two, three, four, five or more contact openings is surrounded by a sealing element. Each contact opening is thus associated with an individual sealing element in this case. As a result, in the event of damage to a sealing element, moisture can infiltrate the contact opening associated with this sealing element, only. The seal of the other contact openings remains unaffected.

In accordance with a further preferred embodiment of the invention it may be provided that the sealing elements surrounding the two, three, four, five or more contact openings are connected to one another, are formed in one piece, or are formed monolithically. An at least partially redundant seal of the plurality of contact openings can thus be achieved. In addition, the production of the energy storage device for example can thus be simplified, since the sealing elements can be attached to the housing in a single process step, for example by injection molding.

In order to facilitate the insertion of the appliance contacts into the contact openings it is advantageous if longitudinal axes of the two, three, four, five or more contact openings are oriented parallel to one another. In particular they can be oriented perpendicular to a housing wall portion in which the contact openings are formed.

It is advantageous if the at least one sealing element is flush-mounted with a housing wall portion in which the at least one contact opening is formed, or protrudes beyond it. A flush-mounted design makes it possible in particular to configure and arrange the sealing element such that it is as inconspicuous as possible. The sealing element protruding beyond the housing wall portion in particular enables an optimal compensation of manufacturing tolerances both of the energy storage device and of the electrical appliance.

The energy storage device can be formed particularly easily if the at least one sealing element is sprayed onto the housing. The sealing element then does not have to be separately fitted and assembled. In addition, no fastening is necessary, since the at least one sealing element is directly connected to the housing by the spraying.

It may also be favorable if a recess surrounding the at least one contact opening is formed on the housing and if the at least one sealing element is formed so as to fill the recess at least in part, in particular completely. The at least one sealing element can be arranged and fastened particularly securely on the housing by the recess. In particular, the at least one sealing element can also be formed in a manner protruding from the recess. In particular, the thickness of the at least one sealing element can thus be increased, whereby manufacturing tolerances of the housing or of the appliance housing can be even better compensated.

In order to further improve the seal of the energy storage device and of the electrical appliance relative to one another, it is favorable if the at least one sealing element forms at least part of an inner wall face delimiting the at least one contact opening. It is thus possible, for example, to also seal off the at least one contact opening in a manner surrounding the electrical contact. In particular, a seal of this kind can thus be achieved not only on an outer face directed away from an outer side of the housing, but also on an inner wall face running in particular transverse, for example also perpendicular, to the outer face.

Each electrically conductive contact is advantageously associated with a contact opening. Each electrically conductive contact can therefore have its own contact opening. A contact opening is then also associated with each electrically conductive contact if all contacts are arranged or formed in a single contact opening.

The number of electrically conductive contacts preferably corresponds to the number of contact openings. The contacts can thus be insulated with respect to one another in a simple way.

A particularly good seal can be achieved if the at least one sealing element is configured in the form of a molded seal or as an O-ring. A molded seal may have in particular an outer contour that is adapted to a corresponding sealing face of the electrical appliance.

In order to be able to use the electrical energy storage device multiple times, it is advantageous if the at least one electrical energy store is configured in the form of a rechargeable battery.

The electrical energy storage device preferably comprises a plurality of electrical energy stores. These can be connected optionally in series or in parallel. In this way, in particular an operating voltage and a capacity of the electrical energy storage device can be specified as desired.

It is advantageous if the electrical energy storage device is configured to be optionally coupled to a plurality of in particular different electrical appliances. A user owning several electrical appliances can thus use the energy storage device optionally for use with one or more of these electrical appliances.

The energy storage device is favorably configured in the form of a battery pack. This preferably comprises a plurality of energy stores, which in particular can be charged by means of a control device of the energy storage device and of which the state of charge can be monitored thereby.

In accordance with a further preferred embodiment of the invention it may be provided that at least one of the at least two electrically conductive contacts comprises one or two electrically conductive flexible contact tongues, which in a starting position abut against one another or define a narrow gap between one another. In particular, all contacts of the energy storage device can be formed in this way. They are then best suited for receiving electrically conductive appliance contacts between the contact tongues and thus establishing a reliable electrical connection between the contacts and the appliance contacts.

In order to facilitate the insertion of the appliance contacts between the contact tongues, it is favorable if free ends of the two contact tongues, which ends are oriented in a manner pointing away from the receiving space, are curved pointing away from one another so as to form lead-in sliding surfaces. The lead-in sliding surfaces are used in particular in order to insert the appliance contacts between the contact tongues.

The present invention further relates to an electrical appliance having at least one electrical load, which is received at least in part, in particular completely, in an appliance housing, which electrical appliance comprises at least two electrically conductive appliance contacts, which are accessible from an outer side of the appliance housing and which are electrically operatively connected directly or indirectly to the at least one electrical load, wherein the at least two appliance contacts are formed in a manner surrounded by and/or protruding from at least one appliance contact protrusion, and wherein the at least one appliance contact protrusion has a polygonal cross-section, in particular a triangular, quadrangular, pentagonal, hexagonal or heptagonal cross-section.

In an electrical appliance of the kind described in the introduction the object stated in the introduction is also achieved in accordance with the invention in that the at least two appliance contacts are surrounded by at least one appliance contact protrusion and/or are formed in a protruding manner, and in that the at least one appliance contact protrusion has a polygonal cross-section.

In particular, the at least one appliance contact protrusion can have a triangular, quadrangular, pentagonal, hexagonal or heptagonal cross-section. Due to the particular shaping of a cross-section of the at least one appliance contact protrusion, this can be inserted in a reliably and optimally sealed manner into the contact opening, formed in particular correspondingly, on the energy storage device. An appliance contact protrusion that has a triangular cross-section can be inserted particularly reliably. In particular, the three corners of the triangular cross-section can be flattened, such that on the whole a hexagonal cross-section of the at least one appliance contact protrusion is provided. The side edges of the cross-sectional area can be in particular of different lengths. The number of axes of symmetry of the appliance contact protrusion can thus be specified as desired, and therefore also the number of possible orientations of the connection between the appliance contact protrusion and the contact opening of the energy storage device. In particular, the at least two appliance contacts can be formed in a manner protruding from a single common appliance contact protrusion. However, a separate appliance contact protrusion can also be provided for each of the at least two appliance contacts. If two or more appliance contact protrusions are provided, these can then also be connected to one another, in particular they can be formed in one piece or monolithically. The at least two appliance contacts can be arranged or formed in particular in a manner fixed on or movable relative to the at least one appliance contact protrusion.

For an optimal electrically conductive connection between the appliance contacts and the contacts of the energy storage device it is favorable if each of the at least two appliance contacts is configured in the form of a contact pin. In particular, the contact pins can be flat and in planar form.

It is favorable if the at least one appliance contact protrusion is formed in such a way that it defines precisely one or precisely three planes of symmetry. In particular, in the case of just a single plane of symmetry, the appliance contact protrusion can be inserted into the contact opening on the energy storage device only in one possible orientation. If the at least one appliance contact protrusion has three planes of symmetry, it can be inserted into a correspondingly formed contact opening in at least three different orientations.

It is favorable if the electrical appliance has at least two, in particular three, four, five or more appliance contact protrusions, each with an appliance contact. For example, two appliance contacts can be arranged on each appliance contact protrusion and can be electrically operatively connected to a positive and a negative pole of the energy storage device in the coupled position. Further appliance contacts and associated appliance contact protrusions can be used in particular for control and maintenance purposes.

The electrical appliance can be formed in a particularly simple manner if the at least two appliance contact protrusions and/or appliance contacts are identical.

In order to facilitate the insertion of the appliance contact protrusion into a contact opening of the energy storage device, it is favorable if a cross-section of the at least one appliance contact protrusion tapers in the direction of a free end thereof. Outer faces of the at least one appliance contact protrusion thus form lead-in sliding surfaces for inner wall faces of the corresponding contact opening.

It is advantageous if the at least two appliance contacts are surrounded by at least one stop face. In particular, the stop face can be arranged and formed in such a way that it is in contact with the at least one sealing element of the energy storage device and thus forms a sealing face so to speak when the electrical appliance and the energy storage device are mechanically and electrically coupled to one another.

The electrical appliance and the energy storage device can be brought into engagement with one another mechanically in a particularly simple way if the at least one appliance contact protrusion protrudes perpendicularly from the at least one stop face.

So that the electrical appliance and the energy storage device, in the coupled position, can be sealed reliably relative to one another, it is favorable if the at least one stop face is a continuous stop face. In particular, a continuous sealing element thus can bear sealingly over its entire extent against the at least one stop face.

In accordance with a further preferred embodiment of the invention it can be provided that the height of the at least one appliance contact protrusion is greater than the width of the at least one stop face. Alternatively, the height may also be less than the width. If the height is greater than the width, a particularly good and reliable mechanical coupling between the at least one appliance contact protrusion and the contact opening can be achieved.

It is advantageous if the at least one stop face bears a continuous sealing rib. In particular if the at least one stop face is opposite the at least one sealing element of the energy storage device in the coupled position, the at least one continuous sealing rib can extend into the at least one sealing element of the energy storage device and thus achieve a selective deformation of the sealing element, whereby a tightness between the electrical appliance and the energy storage device can be improved. The sealing rib in particular can surround all appliance contact protrusions and can form a single, continuous sealing rib. However, a plurality of sealing ribs can also be provided, which each surround an appliance contact protrusion.

It is also favorable if the at least two appliance contact protrusions are surrounded by a stop face. The stop face delimits in particular an insertion depth of the at least two appliance contact protrusions into the corresponding contact openings on the energy storage device.

The electrical appliance can be formed in a simple way if the stop faces of the at least two appliance contact protrusions are connected to one another, formed in one piece, or formed monolithically. In particular, the stop faces can be formed in one piece or monolithically with a wall portion of the appliance housing.

Longitudinal axes of the at least two appliance contact protrusions are preferably oriented parallel to one another. This facilitates the task of bringing said appliance contact protrusions mechanically into engagement with the corresponding contact openings of the energy storage device. The longitudinal axes of the at least two appliance contact protrusions are preferably oriented perpendicular to an appliance housing wall portion that carries the appliance contact protrusions. This facilitates both the production and the task of bringing the electrical appliance into engagement with the energy storage device.

The production of the electrical appliance can be simplified in particular in that the at least two appliance contacts are surrounded by a contact carrier, and in that the contact carrier is mounted on the appliance housing so as to be slidable parallel to or substantially parallel to a longitudinal axis of the appliance contacts. This arrangement of the at least two appliance contacts makes it possible in particular to move the appliance contact protrusions in a defined manner into the contact openings of the energy storage device. The appliance contacts can be arranged on the contact carrier in particular in a fixed manner or movably, in particular slidably, relative thereto. In the latter case they can be surrounded by the contact carrier in a protected position, and in a contact position can be arranged protruding thereeybeyond at least in part.

It is advantageous if the contact carrier is mounted on the appliance housing slidably relative to the appliance contacts. This arrangement of the at least two appliance contacts makes it possible in particular to arrange these on the appliance housing fixedly, i.e. in particular immovably. The contact carrier can then be used in particular as protection for the appliance contacts against mechanical damage and/or against contamination. In particular, the contact carrier, in a separated position, in which the electrical appliance and the electrical energy storage device are fully separated from one another, can surround the appliance contacts in such a way that no electrically conductive parts protrude beyond the appliance contact protrusions. If the electrical energy storage device and the electrical appliance are brought into engagement with one another mechanically and/or electrically, for example the housing can push back the contact carrier, such that the appliance contacts are accessible and can be brought into engagement with the contacts of the energy storage device.

It is favorable if the electrical appliance comprises a biasing arrangement, which holds the contact carrier in a starting position biased in the direction of a free end of the at least two appliance contacts. This embodiment in particular makes it possible to press the contact carrier against the at least one sealing element of the energy storage device when the electrical appliance and the energy storage device are coupled to one another. A seal between the energy storage device and the electrical appliance can thus be improved. In particular, manufacturing tolerances can thus be easily compensated. In particular, the contact carrier in the starting position can assume the above-described protected position, in which it surrounds the appliance contacts protectively. When coupling the energy storage device to the electrical appliance, the contact carrier in particular can thus be moved automatically against the effect of the biasing arrangement, in order to free the appliance contacts protected initially in the protected position.

The biasing arrangement can be formed in a simple way if it comprises at least one biasing element, which on the one hand is supported on the appliance housing and on the other hand is supported on the contact carrier or on the one hand is held on the appliance housing and on the other hand is held on the contact carrier. In particular, the biasing element can have resilient properties in order to transfer the contact carrier automatically into the starting position when the contact carrier is deflected from the starting position against the effect of the at least one biasing element. In particular, the biasing arrangement can comprise two, three or more biasing elements. These can be arranged symmetrically in particular.

The biasing element is favorably configured in the form of a spring element. In particular, it can be configured in the form of a compression spring or tension spring. The spring element can engage in particular in part in a cup-shaped receptacle, which can be formed either on the contact carrier or on the housing.

It is advantageous if the at least one biasing element defines an operating direction which runs parallel or substantially parallel to the longitudinal axes of the at least two appliance contacts. In particular, the contact carrier can thus be moved parallel to the longitudinal axes of the at least two appliance contacts by the at least one biasing element. The risk of the at least one appliance contact protrusion becoming jammed or tilted as it is inserted into the contact opening can thus be minimized.

The electrical load of the electrical appliance is preferably configured in the form of an electric motor. This can drive in particular rotating and/or oscillating tools, for example cutting arrangements of gardening appliances.

It is favorable if the electrical appliance is configured to be optionally coupled to a plurality of in particular different electrical energy storage devices. Depending on the required operating period, one or more energy storage devices can then be coupled to the electrical appliance. For example, different energy storage devices having different charging capacities can be coupled to the electrical appliance.

In order to assist in the gardening work, it is favorable if the electrical appliance is configured in the form of an electrical gardening appliance. In particular, it can be configured in the form of a pushable, ridable or portable gardening appliance.

The electrical gardening appliance is preferably configured in the form of a lawnmower, a hedge trimmer, a chainsaw, a vacuum cleaner, a pressure washer, or a leaf blower. This list of gardening appliances is merely exemplary and is not exhaustive.

It is favorable, in particular also in the case of an electrical appliance of the kind described in the introduction, if the electrical energy storage device is configured in the form of one of the above-described energy storage devices. In this regard there is thus no mandatory requirement that the at least two appliance contacts are formed in a manner protruding from at least one appliance contact protrusion and that the at least one appliance contact protrusion has a polygonal cross-section. If, however, this should be the case, an optimal coupling can be produced both mechanically and electrically between the electrical appliance and the energy storage device.

Of course, it is conversely also possible to provide the at least one sealing element on the electrical appliance in a manner surrounding the at least two appliance contacts. It goes without saying that corresponding adaptations then have to be made both on the electrical energy storage device and on the electrical appliance. The sealing principle, however, remains the same in any case.

In accordance with a further preferred embodiment of the invention it can be provided that the electrical appliance comprises a coupling arrangement for coupling the electrical appliance and the electrical energy storage device in a force-locking and/or positively-locking manner in a coupled position, in which the electrical appliance and the electrical energy storage device are coupled to one another mechanically and/or electrically. By means of the coupling arrangement, the electrical appliance and the energy storage device can thus be brought into engagement with one another in a defined way, so as to operate the electrical appliance with the electrical energy stored in the energy storage device.

In the coupled position the electrical contacts of the energy storage device and the appliance contacts of the electrical appliance are preferably electrically conductively connected to one another. Electrical energy can thus be drawn from the energy storage device by means of the electrical appliance.

The electrical appliance and the energy storage device can be coupled to one another in a simple way if the coupling arrangement comprises at least one first coupling element and at least one second coupling element, if the at least one first coupling element is arranged or formed on the electrical energy storage device, if the at least one second coupling element is arranged or formed on the electrical appliance, and if the at least one first and the at least one second coupling element are engaged in the coupled position in a force-locking and/or positively-locking manner. For example, two or more first coupling elements and two or more second coupling elements, corresponding to the first coupling element, can be provided. By means of these, the electrical appliance and the energy storage device can be brought into a defined position relative to one another, in particular so as to be able to produce a reliable electrical connection between the appliance contacts and the electrical contacts of the energy storage device.

The coupling arrangement can be formed in a simple way if the at least one first coupling element is configured in the form of a coupling protrusion or in the form of a coupling recess and if the at least one second coupling element is formed correspondingly to the at least one first coupling element. For example the coupling protrusions can be configured in the form of rib-like protrusions, and the corresponding coupling recesses can be configured in the form of guide grooves, into which the coupling protrusions can be inserted. The coupling elements cooperating with one another can thus also guide a bringing together of the energy storage device and of the electrical appliance from a fully separated position into the coupled position.

It is favorable if the at least one first and the at least one second coupling element are disengaged in a separated position, in which the electrical appliance and the electrical energy storage device are fully separated from one another. With a coupling arrangement of this kind it is possible in particular to separate the energy storage device fully from the electrical appliance, for example in order to charge the energy storage device again with electrical energy at a charging device.

It can also be advantageous if the electrical appliance comprises a locking arrangement for locking a coupling of the electrical appliance and the electrical energy storage device in a locking position. The locking position can ensure that the energy storage device cannot detach spontaneously and unintentionally from the electrical appliance. In particular, the locking arrangement can be formed in such a way that it can be activated mechanically and/or electrically in order to separate again the energy storage device and the electrical appliance from one another.

It is favorable if the locking arrangement comprises at least one first locking element and at least one second locking element, if the at least one first locking element is arranged or formed on the electrical energy storage device, if the at least one second locking element is arranged or formed on the electrical appliance, and if the at least one first and the at least one second locking element are engaged in a force-locking and/or positively-locking manner in the locking position. The at least one first and second locking elements can be formed in particular independently of the coupling elements. However, they can optionally also cooperate directly or indirectly with the coupling elements. For example, a locking element can be arranged or formed on one of the coupling elements. By means of the locking arrangement, the energy storage device can be prevented from detaching unintentionally from the electrical appliance, as described.

It is also advantageous if the coupling arrangement and the locking arrangement are formed in such a way that the at least one first and the at least one second locking element can be brought into the locking position only if the coupling arrangement assumes the coupled position. By means of a locking arrangement of this kind, it is thus only possible to secure the coupling elements engaged with one another against a relative movement if said coupling elements assume the coupled position.

It is advantageous if the at least one first locking element and/or the at least one second locking element are arranged movably and are movable from the locking position into an unlocking position, in which unlocking position the at least one first locking element and the at least one second locking element are disengaged. By means of the movable arrangement or design of one of the locking elements, it is possible in a simple way to transfer the locking arrangement from the locking position into the unlocking position, and vice versa.

It is favorable if the electrical appliance has a resetting arrangement for automatically transferring the at least one first and/or the at least one second locking element from the unlocking position into the locking position. By means of the resetting arrangement it is possible in particular to automatically lock a connection between the electrical appliance and the energy storage device, more specifically if the energy storage device and the electrical appliance are moved relative to one another into the coupled position and/or assume said position. For example, the resetting arrangement can then automatically move the locking elements of the locking arrangement relative to one another in such a way that they enter into engagement.

It is advantageous if the resetting arrangement comprises at least one resetting element, which is supported on the one hand on the appliance housing and on the other hand on the at least one second locking element or is held on the one hand on the appliance housing and on the other hand on the at least one second locking element. In particular, two, three or more resetting elements can also be provided. The number of resetting elements can be dependent in particular on the number of first and/or second locking elements. For example, the at least one resetting element can be held or mounted on one of the locking elements.

The at least one resetting element is preferably configured in the form of a spring element. For example, it can be configured in the form of a compression spring or tension spring. Optionally a compression spring or tension spring can be used as resetting element depending on the structural design of the locking arrangement.

It is advantageous if the at least one resetting element defines an operating direction which runs transverse, in particular perpendicular, to the operating direction of the at least one biasing element. In particular, the operating direction defined by the at least one resetting element can run transverse to a coupling direction, in which the energy storage device and the electrical appliance have to be moved relative to one another in order to be transferred from the separated position into the coupled position. If the operating directions of the resetting element and of the biasing element are linearly independent of one another, an optimal locking of the coupled position can be achieved by the locking arrangement, in particular.

The locking arrangement can be formed in a simple way if the at least one first locking element is configured in the form of a locking protrusion or in the form of a locking recess and if the at least one second locking element is formed correspondingly to the at least one first coupling element. For example the locking protrusion can be configured in the form of a latching protrusion, which for example can have a latching lug, which in the locking position engages in a corresponding latching recess.

In order to separate the energy storage device from the electrical appliance again when these in the coupled position are locked relative to one another against movement, it is advantageous if an actuation member is arranged or formed on or associated with the at least one first movably arranged locking element and/or the at least one second movably arranged locking element in order to introduce an actuation force for transferring the at least one first movably arranged locking element and/or the at least one second movably arranged locking element from the locking position into the unlocking position. An actuation force can thus be exerted onto the actuation member and moves one of the locking elements, such that the locking elements engaged with one another are disengaged. The energy storage device and the electrical appliance can then be separated from one another.

A user can separate the energy storage device from the electrical appliance in a simple way if the actuation member is arranged freely accessibly on the housing or on the appliance housing.

It is furthermore advantageous if the biasing arrangement holds the contact carrier in the locking position under bias in such a way that the at least one sealing rib is held against the at least one sealing element under bias. As a result of this embodiment a particularly good seal can be achieved between the energy storage device and the electrical appliance when these are mechanically and/or electrically coupled to one another.

Furthermore, a particularly good seal between the electrical appliance and the energy storage device can be achieved if the biasing arrangement holds the contact carrier in the locking position under bias in such a way that the at least one sealing rib is held against the at least one sealing element under bias. The at least one sealing rib of the at least one sealing element can thus be deformed to such an extent that it partially extends into the at least one sealing element and thus achieves a particularly good seal between the stop face, from which the at least one sealing rib protrudes, and the at least one sealing element.

In order to be able to compensate for manufacturing tolerances and in particular also to ensure a particularly good seal between the electrical appliance and the energy storage device, it is favorable if the at least one sealing element is formed from a sealing element material that is softer than the material from which the at least one stop face and/or the at least one sealing rib are formed. An optimal seal between the at least one sealing element and the at least one stop face or the at least one sealing rib can thus be achieved.

The at least one sealing element can be produced in a simple and cost-effective way if the resilient material is a rubber, in particular ethylene propylene diene rubber (EPDM), nitrile rubber (NBR) or polyurethane (PUR), or a thermoplastic elastomer, a thermoplastic copolyamide, a thermoplastic polyester elastomer, a thermoplastic copolyester, a thermoplastic elastomer based on olefin, a styrene block copolymer, a thermoplastic elastomer based on urethane, or a cross-linked thermoplastic elastomer based on olefin.

It is advantageous, in particular also in an electrical appliance of the kind described in the introduction, if the appliance housing has at least one contact opening, through which the at least two appliance contacts are accessible or protrude from the appliance housing, and if the at least one contact opening is surrounded by a continuous sealing element. The sealing element in particular can be formed on the energy storage device, analogously to the above-described sealing element. For an optimal seal of the electrical appliance and of the energy storage device, at least one stop face can be formed optionally on the energy storage device, which stop face then abuts against the sealing element when the electrical appliance and the energy storage device are electrically and/or mechanically engaged with one another. On the other hand, it is also possible for a sealing element to be provided on the energy storage device, which sealing element then abuts against the sealing element of the electrical appliance.

FIG. 1 schematically shows an electrical appliance 10 which is coupled mechanically and electrically to an electrical energy storage device 12 in a coupled position.

The electrical appliance 10 comprises at least one electrical load 14, which in particular can be configured in the form of an electric motor 16.

The electrical appliance 10 can be configured for example in the form of an electrical gardening appliance 18, in particular in the form of a lawnmower, a hedge trimmer, a chainsaw, a vacuum cleaner, a pressure washer, or a leaf blower.

The electrical energy storage device 12 is used to supply electrical energy to the electrical load 14.

A coupling arrangement 20 is used to couple the electrical appliance 10 to the electrical energy storage device 12 in a force-locking and/or positively-locking manner. In the coupled position the electrical appliance 10 and the electrical energy storage device 12 are coupled to one another in particular mechanically.

The coupling arrangement 20 comprises two first coupling elements 22, which are configured, on the energy storage device 12, in the form of groove-shaped coupling recesses 24 running parallel to one another.

Two second coupling elements 26 in the form of coupling protrusions 28 directed towards one another are formed on the electrical appliance 10 and in the coupled position illustrated schematically in FIG. 1 engage in the coupling recesses 24, which are open in a direction facing away from one another. Two centering ribs 32 protrude in the coupling recesses 24, in the region of the rear ends 30 thereof, parallel to the coupling recesses 24 and oriented in the direction of the coupling protrusions 28.

Proceeding from free ends 34 of the coupling protrusions 28, setbacks 36 are formed on said protrusions and, in cooperation with the centering ribs 32, orient the energy storage device 12 on the electrical appliance 10 in a defined manner and additionally form a depth stop by means of sloping stop faces 38 in the transition region from the setback 36 to the coupling protrusions 28.

The first and second coupling elements 22, 26 are engaged in a force-locking and/or positively-locking manner in the coupled position.

In a separated position, in which the electrical appliance 10 and the electrical energy storage device 12 are fully separated from one another, the first and second coupling elements 22, 26 are disengaged.

The electrical energy storage device 12 comprises a housing 40, which defines a receiving space 42, in which at least one electrical energy store 44 is received. In the exemplary embodiment of an energy storage device 12 shown in the Figures, a total of five energy stores 40 are arranged in the receiving space 42.

The energy stores 44 are configured in the form of rechargeable batteries 46. These may be batteries such as, in particular, nickel-metal hydride batteries, lithium-ion batteries, or lithium-polymer batteries.

Figure 6:
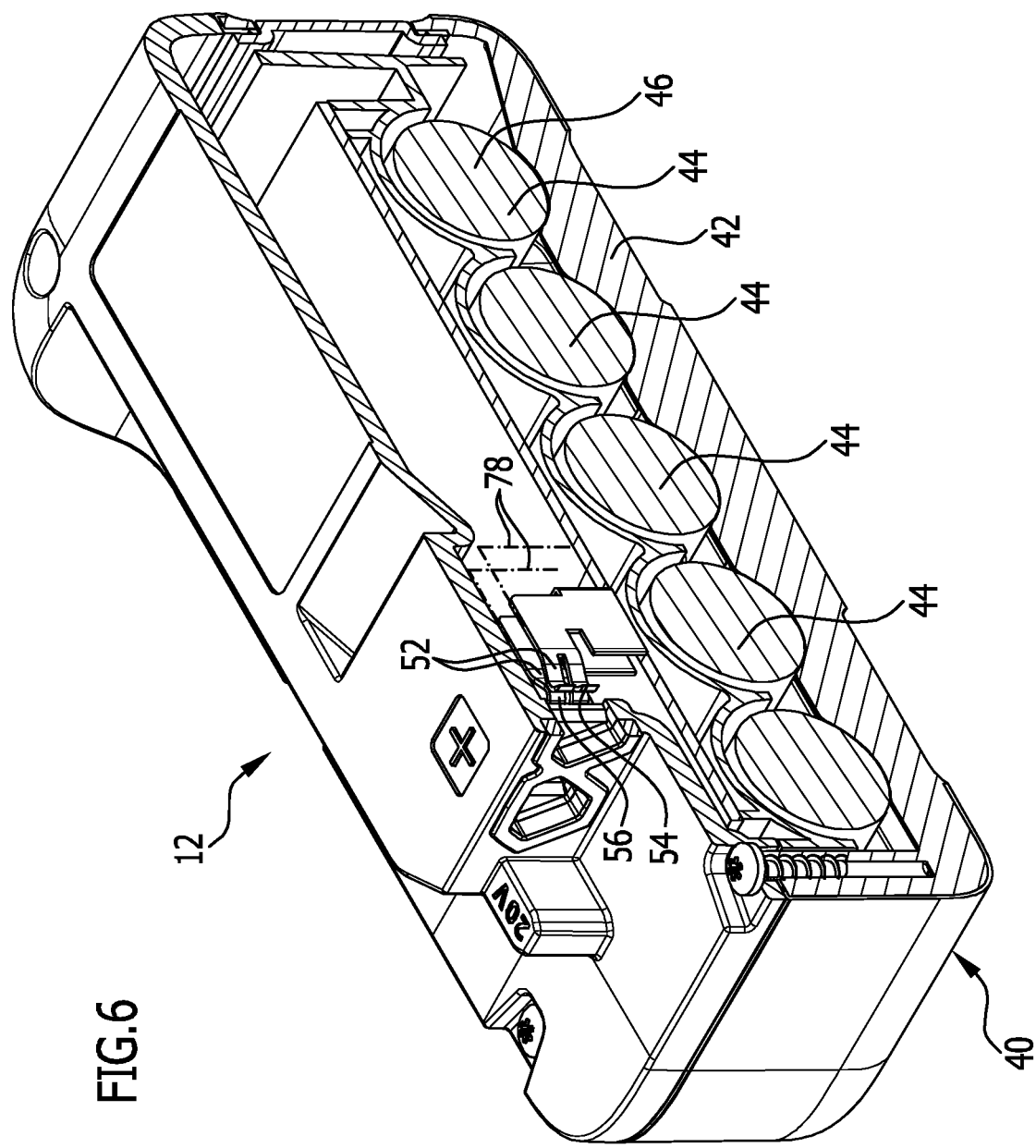
FIG. 6 shows a sectional view along line 6-6 in FIG. 5.

The energy stores 44 can be connected in parallel and/or in series, depending on the desired output voltage. They are electrically operatively connected directly or indirectly by means of a control device 48, which is shown purely schematically in a dashed manner in FIG. 7, to two of a total of three electrical contacts 50. The contacts 50 each comprise two electrically conductive, flexible contact tongues 52, which abut against one another in a starting position, as shown schematically in FIGS. 6 and 8. They may optionally also define a narrow gap between one another.

Free ends 54 of the two contact tongues 52, which ends are oriented pointing away from the receiving space 42, are curved directed away from one another so as to form lead-in sliding surfaces 56.

The three contacts 50 are accessible through a contact opening 58 each in the housing 40. They may optionally also protrude beyond the housing 40.

Figure 8:
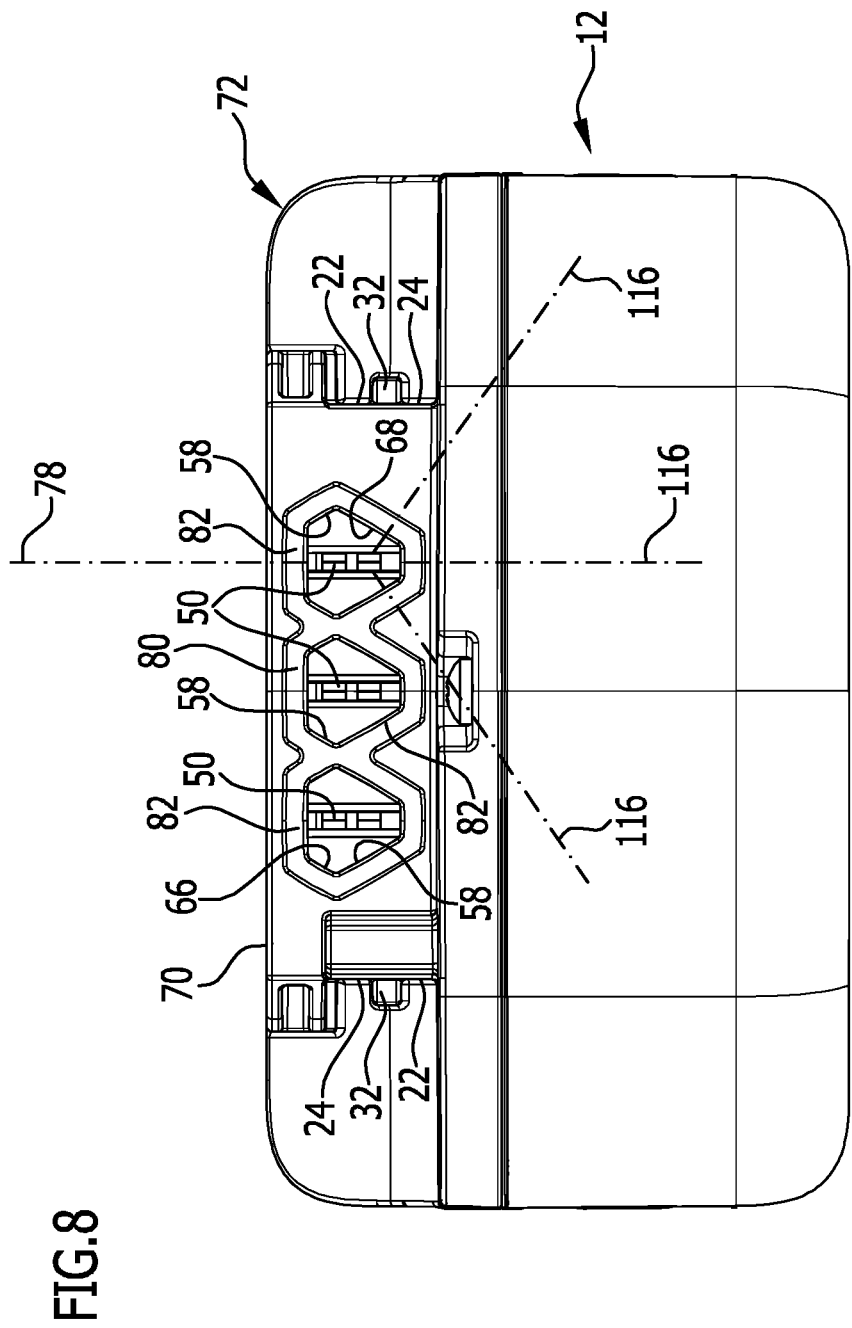
FIG. 8 shows a plan view of the energy storage device in the region of the contact openings.
Figure 9:
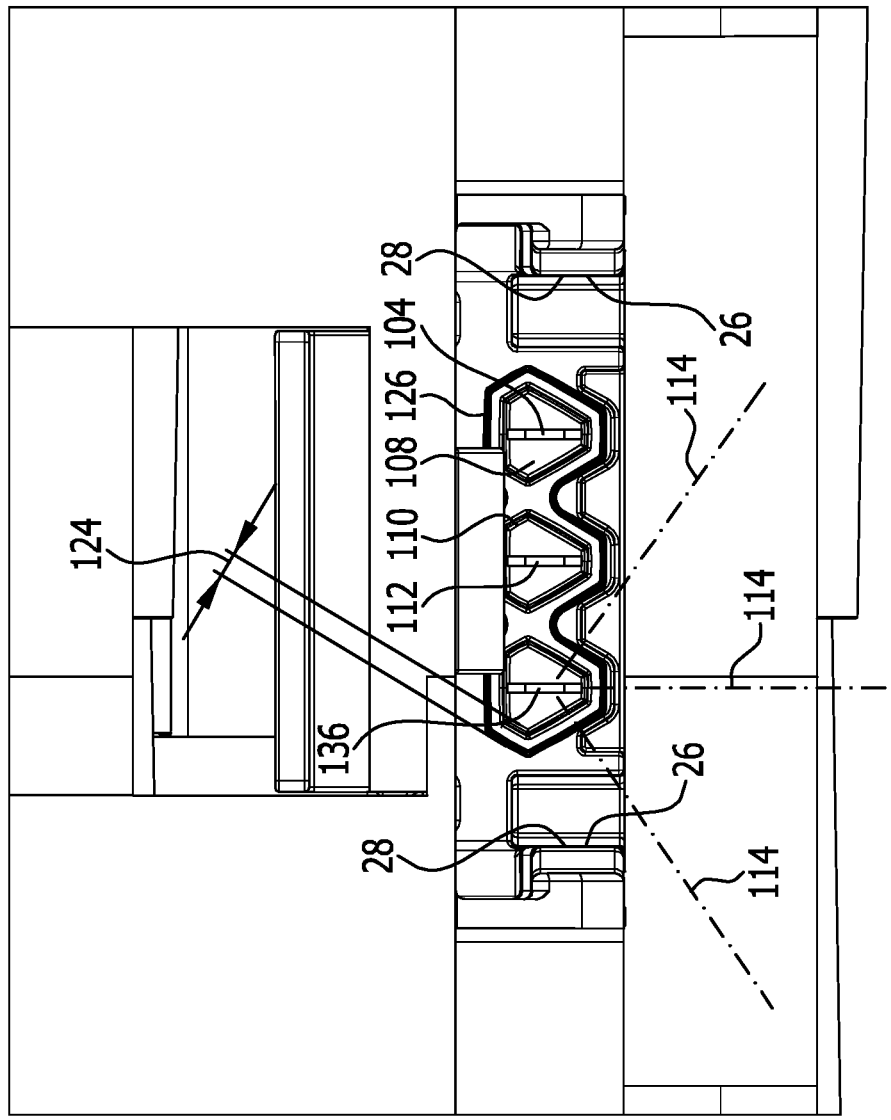
FIG. 9 shows a plan view of the electrical appliance in the region of the appliance contacts.

The contact openings are hexagonal in cross-section, as can be seen clearly in FIG. 8.

Longitudinal axes 60 of the contact openings 50 are oriented parallel to one another and run perpendicular to a planar housing wall portion 62 of the housing 40. An end of the coupling recesses 24 pointing away from the centering rib 32 ends in line with a wall portion face 64 directed outwardly from the housing wall portion 62.

The contact openings 58 have threefold symmetry with respect to their respective longitudinal axes 60. The contact openings 58 are delimited by short sides 66 and long sides 68 of a hexagon in alternation.

The housing wall portion 62 is formed on a housing upper part 72, perpendicular to a side wall 70 thereof. The housing upper part 72 is fixed on the housing 40 by fastening elements 74 in the form of fastening screws 76.

Three aligned long sides 68 of the adjacently arranged contact openings 58 run parallel to the side wall 70.

The longitudinal axes 60 of the contact openings 58 also define the longitudinal axes defined by the contacts 50. The contact tongues 52 formed from flat strips each define a contact plane 78 which runs perpendicular to the side wall 70.

A sealing element 80 is arranged on the housing wall portion 62 in a manner surrounding the contact openings 58. It faces away from the housing wall portion 62. The sealing element 80 is defined by a total of three identical sealing elements 82, which are each arranged surrounding a contact opening 58. The sealing elements 82 are connected to one another in order to form the sealing element 80.

A contact face 84 directed away from the housing wall portion 62 runs parallel to the wall portion face 64 and protrudes slightly beyond it. The stop face 84 may optionally also be flush-mounted with the wall portion face 64 or may be formed slightly set back relative thereto in the housing wall portion 62.

A recess 86 is formed in the transition region from the housing wall portion 62 to the particular contact opening 58 and on the one hand has a recess inner face 88 formed from six face regions in the direction of the contact opening 58 and on the other hand has a sealing face 90 directed away from the housing upper part 72, parallel to the wall portion face 64.

The sealing element 80 or 82 fills out the recess 86 practically completely.

The sealing element 80 or the sealing elements 82, as can be clearly seen in FIG. 7a, form part of an inner wall face 92 delimiting the particular contact opening 58.

The contact openings 58 are identical. Furthermore, a contact opening 58 is associated with each contact 50.

The number of electrically conductive contacts 50 additionally corresponds to the number of contact openings 58.

The sealing elements 80 or 82 can be configured in particular in the form of molded seals or as O-rings. Furthermore, they can also be sprayed onto the housing 40, or the housing upper part 72, by injection molding. The housing 40 or the housing upper part 72 can itself be produced from a suitable plastics material by plastics injection molding.

The sealing elements 80 or 82 are formed from a sealing element material. The housing wall portion 62, optionally also the entire housing upper part 72 and the housing 40, can be formed partially or wholly from a housing material. The housing material is preferably harder than the sealing element material. In other words, the sealing element material is softer than the housing material and in particular is resiliently deformable. The thickness 94 of the sealing elements 80 or 82 lies in particular in a range of from approximately 0.2 mm to approximately 2 mm. In particular the thickness 94 can lie in a range of from approximately 0.4 mm to approximately 0.8 mm.

The width 96 of the sealing element 80 or 82, extending parallel to the sealing face 90, is preferably approximately 0.5 mm to approximately 5 mm. However, it may also lie in a range of from only approximately 1.5 mm to approximately 2.5 mm.

The sealing elements 80 or 82 are formed from a resilient material or contain a resilient material.

The resilient material can be in particular a plastic, for example a thermoplastic, or a rubber, for example ethylene propylene diene rubber (EPDM), nitrile rubber (NBR) or polyurethane (PUR).

The plastics material or the plastics mix are, or preferably contain, a thermoplastic elastomer or a plurality of thermoplastic elastomers.

Thermoplastic copolyamides, thermoplastic polyester elastomers, thermoplastic copolyesters, thermoplastic elastomers based on olefin, styrene block copolymers, thermoplastic elastomers based on urethane, or cross-linked thermoplastic elastomers based on olefin can be used as thermoplastic elastomers in order to form the sealing elements 80 or 82.

The described energy storage device 12 is also configured to be optionally coupled to different electrical appliances 10. This is possible in particular when the second coupling elements 26 of the coupling arrangement 20 are formed on the different electrical appliances 10 such that they can be brought into engagement with the first coupling elements 22 of the energy storage device 12 in the coupled position.

The energy storage device 12 may alternatively also be referred to as a battery pack 98.

The shape of the housing openings 58 can also be referred to in particular as Wankel shaped.

The electrical appliance 10 comprises an appliance housing 100, which is shown in the Figures merely partially and schematically. The load 14 is received therein at least partially, in particular completely.

Electrically conductive appliance contacts 104 are accessible from an outer side 102 of the appliance housing 100, but are protected or hidden in a starting position (not shown in the Figures). They are electrically operatively connected directly or indirectly to the load 14 by means of a control arrangement (not shown in greater detail) of the electrical appliance 10. The electrical appliance 10 shown schematically in the Figures has three identical appliance contacts 104 in the form of contact pins 106, which in particular are fixed to the appliance housing 100 in flat and planar form.

The appliance contacts 104 are surrounded by appliance contact protrusions 108 in the above-described protected position, in which the electrical appliance 10 and the energy storage device 12 are mechanically and/or electrically separated from one another, and protrude beyond the appliance contact protrusions 108 in a coupled position, in which they are engaged with the contacts 50. The appliance contact protrusions 108 have a polygonal cross-section and are arranged movably relative to the appliance contacts 104. The cross-section may be in particular triangular, quadrangular, pentagonal, hexagonal or heptagonal in form.

A cross-section of the appliance contact protrusions 108 is formed correspondingly to the cross-sections of the contact openings 58, such that the appliance contact protrusions 108 in the coupled position can engage in a positively-locking manner in the contact openings 58. Each appliance contact protrusion has six outer faces, more specifically three narrow outer faces 110 and three broad outer faces 112 arranged in alternation therewith.

Each of the three appliance contact protrusions 108, in the exemplary embodiment shown in the Figures, has three planes of symmetry 114, which enclose between one another an angle of 60° in each case. These planes of symmetry 114 are coincident with three planes of symmetry 116 oriented analogously relative to one another when the energy storage device 12 and the electrical appliance 10 assume the coupled position.

The appliance contact protrusions 108 are associated with one of the three appliance contacts 104 each. Both the appliance contact protrusions 108 and the appliance contacts 104 are identical in each case.

A cross-section of the appliance contact protrusions 108 tapers towards a free end, which is defined by a planar end face 118.

The appliance contacts 104 are surrounded by a stop face 120, more specifically in such a way that the appliance contact protrusions 108 protrude perpendicular from this stop face 120.

The stop face 120 is continuous and primarily has a form corresponding in plan view to the contour of the sealing element 80.

The height 122 of the appliance contact protrusions 108 is greater than the width 124 of the stop face 120.

A sealing rib 126 is formed in a manner protruding from the stop face 120.

If the energy storage device 12 and the electrical appliance 10 assume the coupled position, as shown in particular in FIG. 7a, the contact face 84 of the sealing element 80 or 82 abuts against the stop face 120. The sealing rib 126 then digs in slightly into the sealing element 80 or 82.

The longitudinal axes 128 of the appliance contact protrusions 108 are oriented parallel to one another. They also protrude perpendicularly from an appliance housing wall portion 130 which carries the appliance contact protrusions 108.

The appliance housing wall portion 130 forms part of a contact carrier 132, which in a starting position surrounds the appliance contacts 104 protectively. The contact carrier 132 is mounted on the appliance housing 100 slidably parallel to the longitudinal axes 128 of the appliance contacts 104 and relative thereto.

Figure 2:
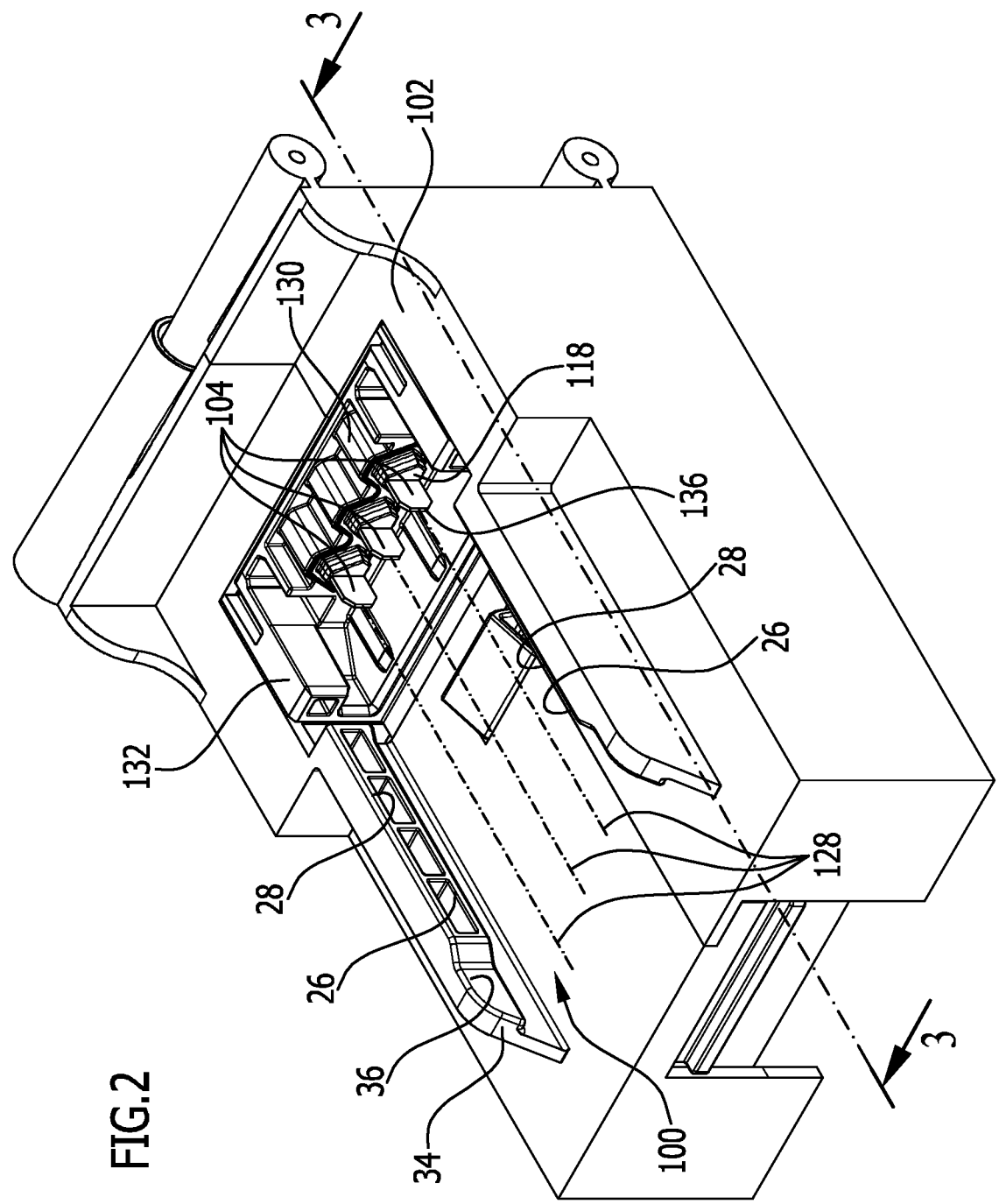
FIG. 2 shows a perspective partial view of the electrical appliance.
Figure 3:
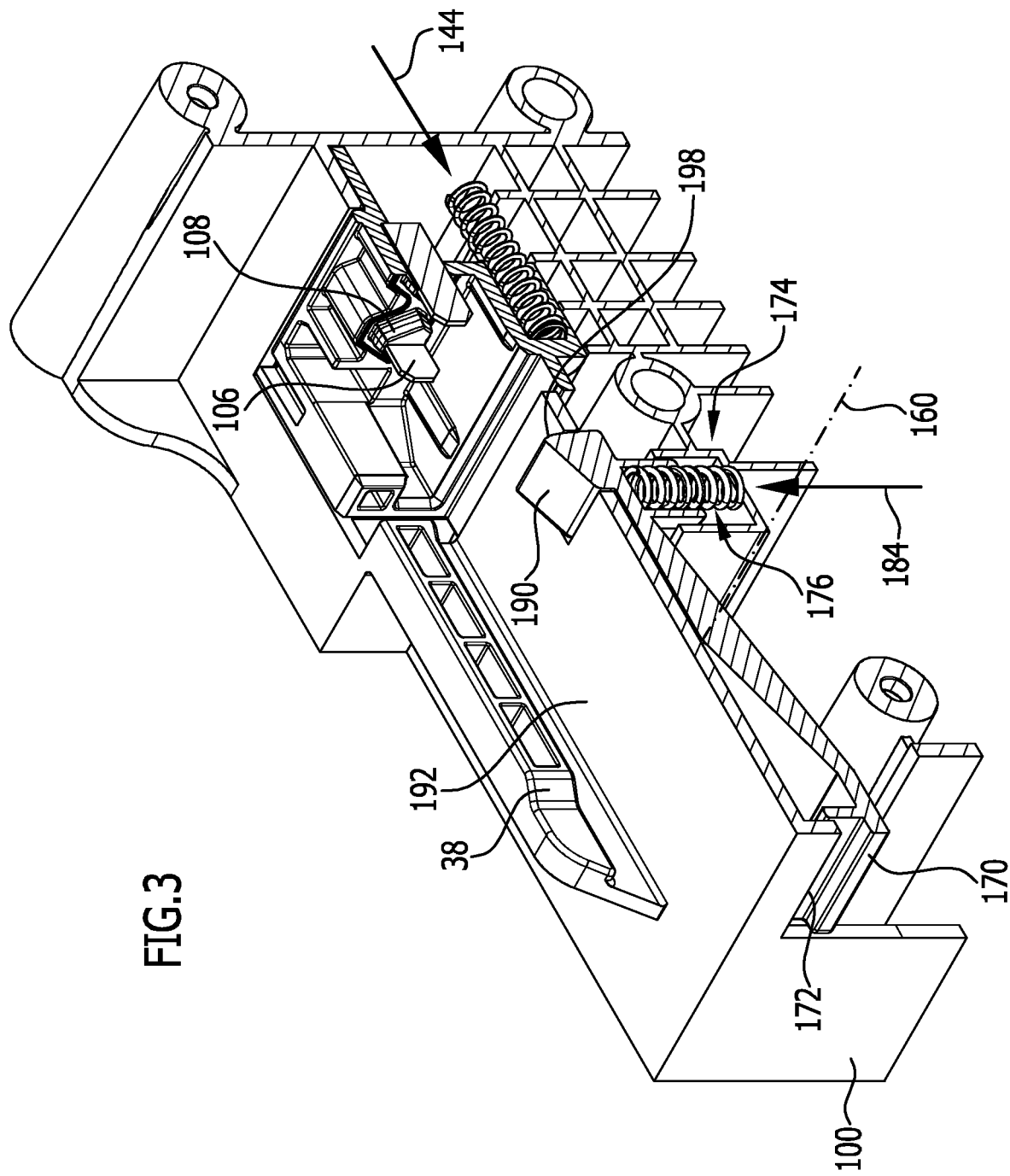
FIG. 3 shows a sectional view along line 3-3 in FIG. 2.

The electrical appliance 10 further comprises a biasing arrangement 134, which in a starting position holds the contact carrier 132 under bias in a manner oriented in the direction of the free ends 136 of the appliance contacts 104 and, in this starting position (not shown in the Figures) surrounds or covers the appliance contacts 104 protectively, as described above. FIGS. 2 and 3 show the contact carrier 132 and the biasing arrangement 134 schematically in the deflected position, that is to say in the position assumed by the contact carrier 132 in the coupled position of the coupling arrangement 20.

The biasing arrangement 134 comprises a biasing element 138. This is supported on the one hand on the contact carrier 132 and on the other hand on the appliance housing 100. It is configured in the form of a spring element 140, more specifically as a compression spring which is formed as a coil spring.

Alternatively, the biasing element 138 could also be held on the one hand on the appliance housing 100 and on the other hand on the contact carrier 132 and could be configured in the form of a tension spring.

In the exemplary embodiment shown in the Figures a blind bore-like spring element receptacle 142 is formed on the contact carrier 132 and is open parallel to the longitudinal axes 128, facing in the direction opposite the ends 136.

The biasing element 138 defines an operating direction which is symbolized by the arrow 144 and runs parallel to the longitudinal axes 128.

The electrical appliance 10 is configured in particular to be optionally coupled to a plurality of in particular different electrical energy storage devices 12. These may be of different sizes, but in particular are configured such that they can be coupled to the second coupling elements of the electrical appliance 10.

In the coupled position the electrical contacts 50 of the energy storage device 12 and the appliance contacts 104 of the electrical appliance 10 are electrically conductively coupled to one another. As can be seen in particular in FIG. 4, the appliance contacts 104 engage between the two contact tongues 52 of the appliance contacts 50 and are electrically operatively connected thereto.

In order to secure the energy storage device 12 to the electrical appliance 10 in the coupled position, a locking arrangement 146 is used. This locking arrangement comprises a first locking element 148, which is arranged or formed on the energy storage device 12, and a second locking element 150 arranged or formed or mounted movably on the electrical appliance 10.

Figure 4:
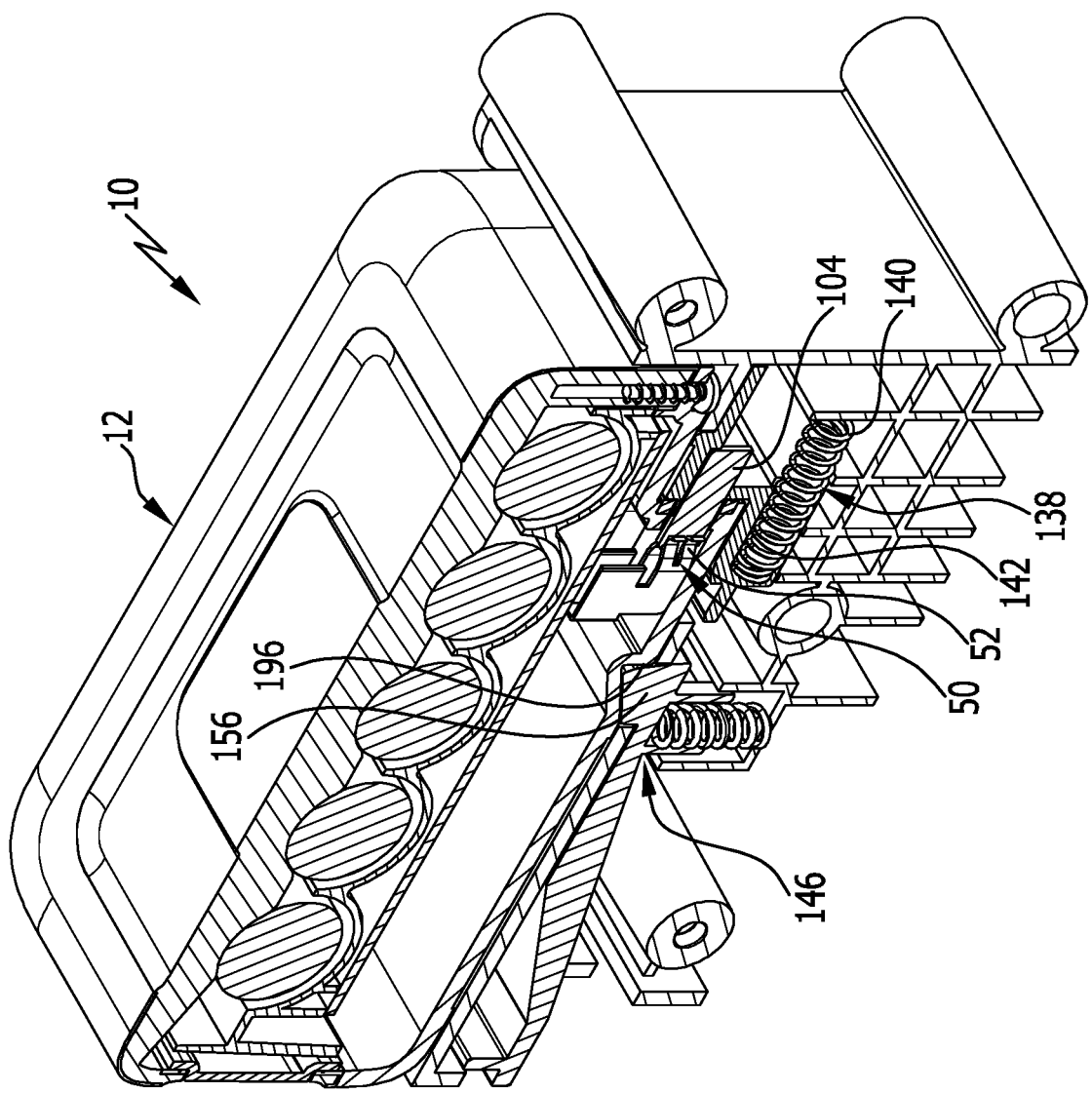
FIG. 4 shows a sectional view along line 4-4 in FIG. 1.
Figure 5:
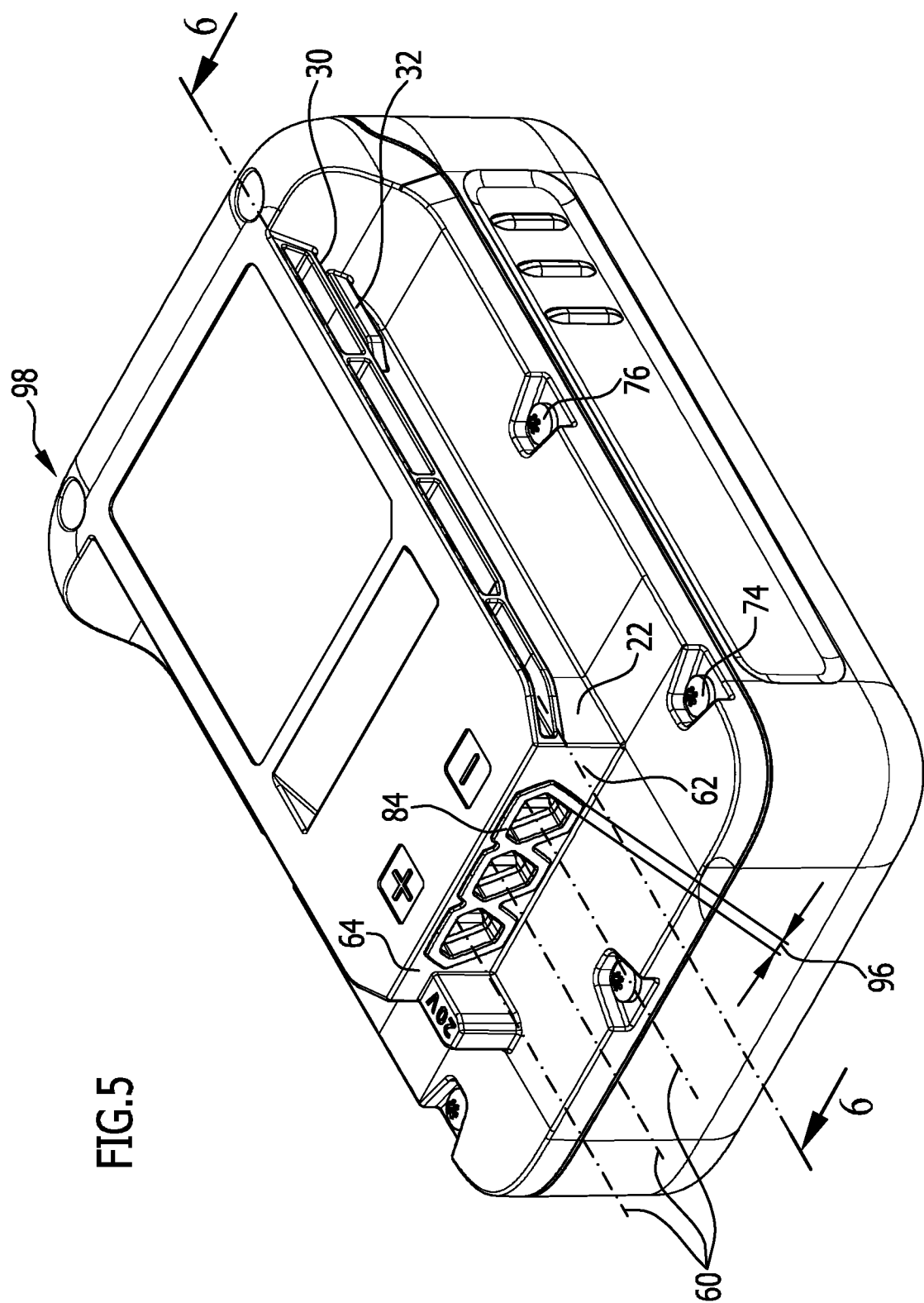
FIG. 5 shows a perspective view of the energy storage device from FIG. 1.
Figure 7:
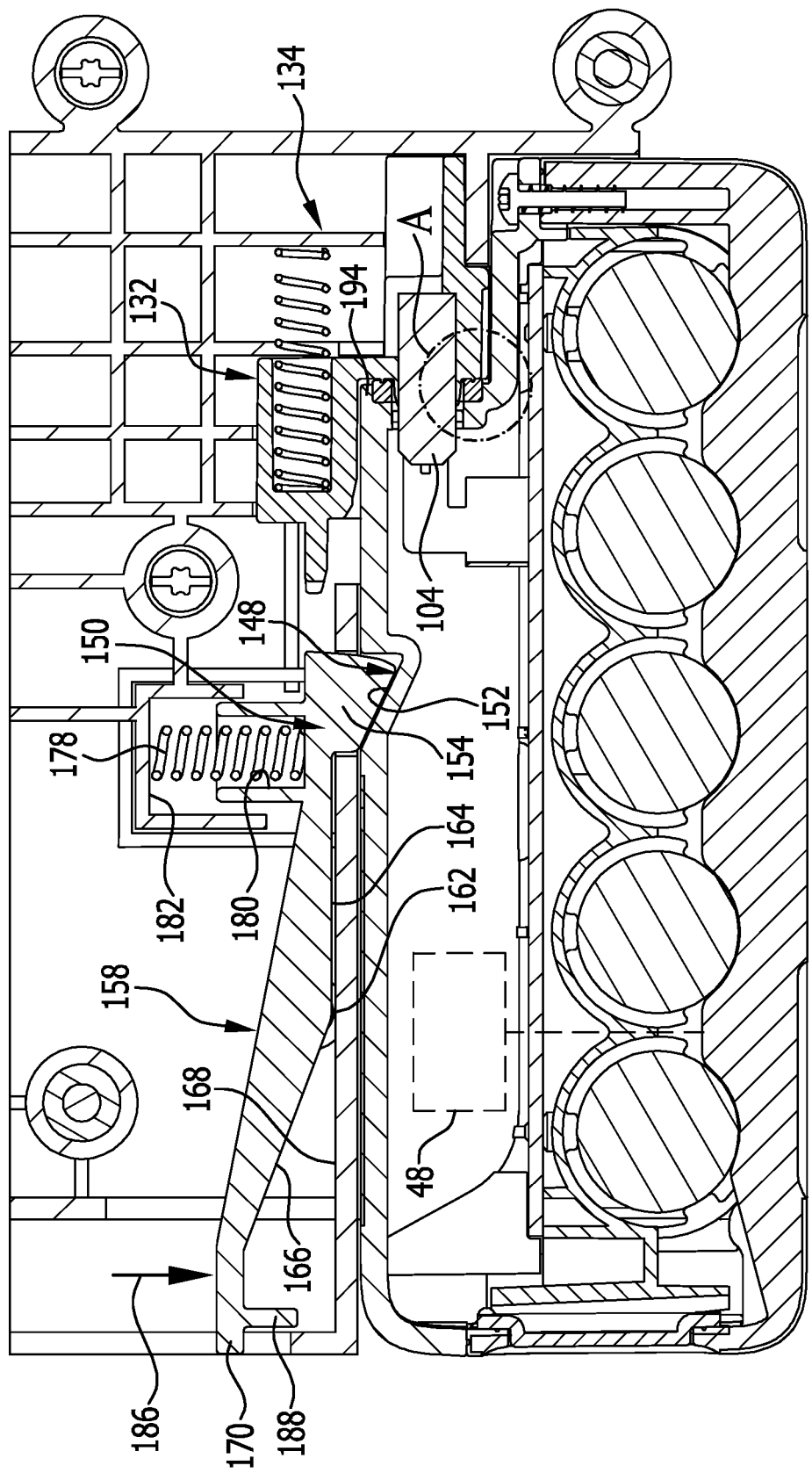
FIG. 7 shows a sectional view along line 7-7 in FIG. 1.

The first locking element 148 and the second locking element 150 are engaged in a force-locking and/or positively-locking manner in a locking position (as shown for example in FIGS. 4 and 7). The first locking element 148 is configured in the form of a locking recess 152, and the second locking element 150 is configured correspondingly hereto in the form of a locking protrusion 154.

The locking recess 152 is configured in the form of a recess of triangular cross-section on the housing upper part 72 of the energy storage device 12. The locking protrusion 154 forms a protruding latching member 156 on a free end of an angled locking lever 158.

The coupling arrangement 20 and the locking arrangement 146 in particular are formed in such a way that the locking elements 148 and 150 can be brought into the locking position only if the coupling arrangement 20 assumes the coupled position.

The movably arranged second locking element 150 is movable, in particular pivotable, from the locking position into an unlocking position, moreover about a pivot axis 160, which is defined by an edge 162 of the locking lever 158. The edge 162 delimits two planar surface portions 164 and 166. In the locking position the surface portion 164 abuts against a counter bearing face 168 of the electrical appliance 10.

A free end of the locking lever 158 directed away from the locking protrusion 154 forms an actuation member 170, which is freely accessible at the appliance housing 100. It protrudes slightly from an opening 172 in the appliance housing 100.

A resetting arrangement 174 for automatically transferring the second locking element 150 from an unlocking position, in which the locking elements 148 and 150 are disengaged, into the locking position is also provided on the electrical appliance 10.

The resetting arrangement 174 comprises a resetting element 176, which is supported on the one hand on the appliance housing 100 and on the other hand on the locking lever 158 and thus indirectly on the second unlocking element 150.

The resetting element 176 is configured in the form of a spring element 178, more specifically as a compression spring in the exemplary embodiment shown in the Figures.

A blind bore-shaped spring element receptacle 180 is formed on the locking lever 158 in the opposite direction as compared to the locking protrusion 154, with the spring element 178 being inserted approximately over half of its length into said receptacle. A support face 182 of the appliance housing 100 is formed opposite the spring element receptacle 180, with the spring element 178 being supported by means of its other end at said support face.

The resetting element 176 defines an operating direction which is defined by the arrow 184 and which runs transverse to the operating direction 144 of the biasing element 138. In particular, the operating direction 184 runs transverse, in particular perpendicular, to a longitudinal direction which is defined by the first and second coupling elements 22 and 24 and which runs parallel to the longitudinal axes 128.

If a force is exerted onto the actuation member 170 in the direction of the arrow 186, the locking lever 158 is pivoted about the edge 162 until a cuboidal stop member 188 protruding from the actuation member 170 in the direction of the counter bearing face 168 contacts the counter bearing face 168. During this pivoting movement, the locking lever 158 compresses the spring element 178, and the locking protrusion 154 frees the locking recess 152. The energy storage device 12 can now be removed from the electrical appliance 10, parallel to the longitudinal axes 128. In so doing, the contact carrier 132 is pushed back into the starting position by the biasing force of the biasing arrangement 134, and the electrical appliance 10 and the energy storage device 12 are electrically decoupled.

The biasing arrangement 134 is formed in such a way that it holds the contact carrier 132 under bias when the electrical appliance 10 and the energy storage device 12 are coupled to one another in the locking position, such that the stop face 120 is held under bias against the sealing element 80 or 82. In FIG. 7 the biasing element 138 is thus under stress and presses the sealing rib 126 into the sealing element 80 or 82.

The sealing element 80 or 82 is formed from a sealing element material which is softer than the material from which the stop face 120 or the sealing rib 126 is formed. In particular, the stop face 120 can be formed in one piece or monolithically with the sealing rib 126.

A lead-in sliding surface 190 is formed on the locking protrusion 154 and is oriented with at least one component parallel to the longitudinal axes 128. The lead-in sliding surface 190 protrudes slightly into an insertion region 192 of the energy storage device 12, which insertion region is delimited laterally in particular by the second coupling elements 26.

If the energy storage device 12 is advanced into the insertion region 192 with the contact openings 58 first, the lead-in sliding surface 190 slides over an edge 194 of the housing upper part 72, which pushes the locking protrusion 154 out from the insertion region 192, against the effect of the spring element 178.

As soon as a latching edge 196 of the locking recess directed away from the appliance contacts 104 can engage from behind with a latching face 198 on the locking protrusion 154 oriented in the direction of the appliance contacts 104, the spring element 178 presses the locking protrusion automatically into the locking recess 152. In this way, the energy storage device, at the time of coupling to the electrical appliance 10, is automatically locked when it is coupled mechanically and/or electrically to the electrical appliance 10.

For an optimal seal the contact carrier 132, when the energy storage device 12 is coupled to the electrical appliance 10, is deflected slightly against the action of the biasing arrangement 134. This, however, holds the stop face 120 pressed against the sealing element 80 or 82. An optimal seal can thus be achieved between the electrical appliance 10 and the energy storage device 12 in order to prevent the infiltration of moisture in particular in the region of the contacts 50 and the appliance contacts 104.

LIST OF REFERENCE SIGNS 10 electrical appliance
12 energy storage device
14 load
16 electric motor
18 gardening appliance
20 coupling arrangement
22 first coupling element
24 coupling recess
26 second coupling element
28 coupling protrusion
30 end
32 centering rib
34 end
36 setback
38 stop face
40 housing
42 receiving space
44 energy store
46 battery
48 control arrangement
50 contact
52 contact tongue
54 end
56 lead-in sliding surface
58 contact opening
60 longitudinal axis
62 housing wall portion
64 wall portion face
66 short side
68 long side
70 side wall
72 housing upper part
74 fastening element
76 fastening screw
78 contact plane
80 sealing element
82 sealing element
84 contact face
86 recess
88 recess inner face
90 sealing face
92 inner wall face
94 thickness
96 width
98 battery pack 100 appliance housing
102 outer side
104 appliance contact
106 contact pin
108 appliance contact protrusion
110 narrow outer face
112 broad outer face
114 plane of symmetry
116 plane of symmetry
118 end face
120 stop face
122 height
124 width
126 sealing rib
128 longitudinal axis
130 appliance housing wall portion
132 contact carrier
134 biasing arrangement
136 end
138 biasing element
140 spring element
142 spring element receptacle
144 arrow
146 locking arrangement
148 first locking element
150 second locking element
152 locking recess
154 locking protrusion
156 latching member
158 locking lever
160 pivot axis
162 edge
164 surface portion
166 surface portion
168 counter bearing face
170 actuation member
172 opening
174 resetting arrangement
176 resetting element
178 spring element
180 spring element receptacle
182 support face
184 arrow
186 arrow
188 stop member
190 lead-in sliding surface
192 insertion region
194 edge
196 latching edge
198 latching face

The invention claimed is:

1. An electrical energy storage device for an electrical appliance, which electrical energy storage device comprises a housing, which housing defines a receiving space in which at least one electrical energy store is received, which electrical energy storage device comprises at least two electrically conductive contacts which are accessible from an outer side of the housing and which are electrically operatively connected directly or indirectly to the at least one electrical energy store,
wherein the housing has two or more contact openings, through which the at least two contacts are accessible or protrude from the housing, and wherein each of the two or more contact openings are surrounded by a continuous sealing element;
wherein each of the two or more contact openings is surrounded by an individual sealing element,
wherein the individual sealing elements surrounding the two or more contact openings are connected to one another, formed in one piece, or formed monolithically, so as to form the continuous sealing element,
wherein recesses surrounding each of the two or more contact openings are formed on an outer side of the housing, and wherein the recess associated with the respective contact opening of the two or more contact openings is filled with the associated sealing element at least in part, and
wherein each individual sealing element forms at least part of an inner wall face delimiting each of the two or more contact openings.

2. The electrical energy storage device according to claim 1, wherein at least one of the following conditions is met:
a) the continuous sealing element is formed from a sealing element material, wherein the housing is formed at least partially of at least one housing material, and wherein the sealing element material is softer than the housing material;
b) a thickness of the at least one sealing element lies in a range of from approximately 0.2 mm to approximately 2 mm;
c) a width of the continuous sealing element lies in a range of from approximately 0.5 mm to approximately 5 mm, in particular in a range of from approximately 1.5 mm to approximately 2.5 mm.

3. The electrical energy storage device according to claim 1, wherein
the continuous sealing element is formed from a resilient material or contains a resilient material, wherein the resilient material is a plastics material or a plastics mix, and wherein the plastics material or the plastics mix is a thermoplastic elastomer or contains at least one thermoplastic elastomer.

4. The electrical energy storage device according to claim 1, wherein at least one of the following conditions is met:
a) the two or more contact openings have a polygonal cross-section;
b) the two or more contact openings are formed in such a way that it defines precisely one plane of symmetry or precisely three planes of symmetry.

5. The electrical energy storage device according to claim 1, wherein at least one of the following conditions is met:
a) the two or more contact openings are identical;
b) longitudinal axes of the two or more contact openings are oriented parallel to one another, namely perpendicular to a housing wall portion in which the contact openings are formed.

6. The electrical energy storage device according to claim 1, wherein at least one of the following conditions is met:
a) the at least one sealing element is flush-mounted with a housing wall portion in which the two or more contact openings are formed, or protrudes beyond it;
b) the continuous sealing element is sprayed onto the housing;
c) each electrically conductive contact is associated with a contact opening;
d) the number of electrically conductive contacts corresponds to the number of contact openings;
e) the continuous sealing element is configured in the form of a molded seal or as an O-ring.

7. The electrical energy storage device according to claim 1, wherein at least one of the following conditions is met:
a) the at least one electrical energy store is configured in the form of a rechargeable battery;

b) the electrical energy storage device comprises a plurality of electrical energy stores;
c) the electrical energy storage device is configured to be selectively coupled to a plurality of electrical appliances;
d) the energy storage device is configured in the form of a battery pack;
e) at least one of the at least two electrically conductive contacts comprises one or two electrically conductive, flexible contact tongues, which in a starting position abut against one another or define a narrow gap between one another.

8. An electrical energy storage device for an electrical appliance, which electrical energy storage device comprises a housing, which housing defines a receiving space in which at least one electrical energy store is received, which electrical energy storage device comprises at least two electrically conductive contacts which are accessible from an outer side of the housing and which are electrically operatively connected directly or indirectly to the at least one electrical energy store,
wherein the housing has two or more contact openings, through which the at least two contacts are accessible or protrude from the housing, and wherein the two or more contact openings are surrounded by a continuous sealing element,
wherein each of the at least two or more contact openings is directly surrounded by an individual sealing element,
wherein the individual sealing elements jointly form the continuous sealing element,
wherein recesses surrounding each of the two or more contact openings are formed on an outer side of the housing, and wherein recess associated with the respective contact opening of the two or more contact openings is filled with the associated individual sealing element at least in part, and
each individual sealing element forms at least part of an inner wall face delimiting each of the two or more contact openings.

9. The electrical energy storage device according to claim 1, wherein each of the at least two, three, four, five or more contact openings are formed in a housing wall portion of the housing, wherein each recess surrounding one of the contact openings is formed in a transition region from the housing wall portion to the respective contact opening.

10. The electrical energy storage device according to claim 9, wherein each recess has a circumferential recess inner face in the direction of the respective contact opening and a sealing face directed away from the housing wall portion.

* * * * *